March 23, 1926.
J. A. FOX
1,577,707
SIGNALING DEVICE FOR MOTOR VEHICLES
Filed March 24, 1924
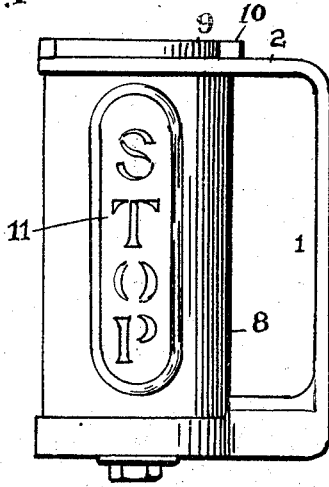
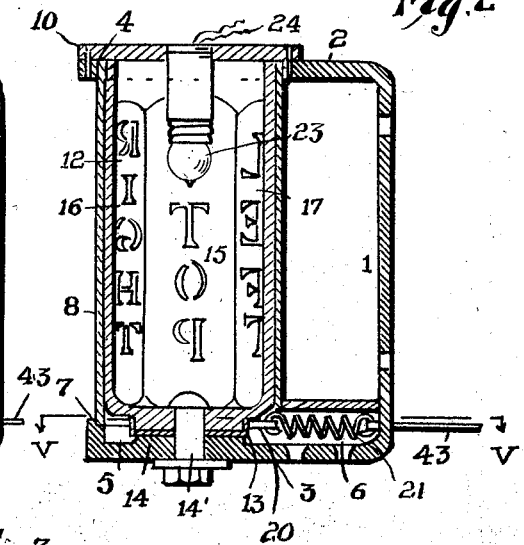
INVENTOR
James A. Fox
By Jas R. Bryan
Attorney Patented Mar. 23, 1926.

1,577,707

UNITED STATES PATENT OFFICE.

JAMES A. FOX, OF WARREN, OHIO.

SIGNALING DEVICE FOR MOTOR VEHICLES.

Application filed March 24, 1924. Serial No. 701,321.

*To all whom it may concern:*

Be it known that I, JAMES A. FOX, a citizen of the United States, residing at Warren, in the county of Trumbull and State of Ohio, have invented certain new and useful Improvements in Signaling Devices for Motor Vehicles, of which the following is a specification.

This invention relates to electric signaling devices for motor vehicles, and the primary object thereof is to provide a device of the type described, which is operable to selectively signalize to the operator of an approaching, passing or following vehicle, the intentions of the driver relative to intended operations or movement of his vehicle, under such conditions eliminating confusion and minimizing accidents ordinarily attending the operation of motor vehicles.

Other objects of this invention are to provide a signal device of the character stated, which embodies manifold signals, which is readily discernible during daylight and especially at night, and which will simultaneously indicate the same signals on both its front and rear faces.

Further objects of the invention are to provide a device of the class stated, which is simple in its construction and arrangement, strong, durable and efficient in its use, positive in its action, attractive in appearance, and comparatively inexpensive to manufacture.

To the accomplishment of these and such other objects as may hereinafter appear, the invention consists of the novel construction, combination and arrangement of parts herein specifically described and illustrated in the accompanying drawing wherein is shown an embodiment of the invention, but it is to be understood that changes, variations and modifications can be resorted to which come within the scope of the claim hereunto appended.

In the drawing forming a portion of this specification and wherein like numerals of reference designate corresponding parts throughout the several views:—

Figure 1 is a side elevation of a signaling device in accordance with my invention.

Figure 2 is a vertical sectional view thereof.

Figure 3 is a vertical view of the lens member.

Figure 4 is a sectional view on line IV—IV, Figure 3.

Figure 5 is a sectional view on line V—V, Figure 2.

Figure 6 is a diagrammatic view of the wiring and operating mechanism of the device.

Figure 7 is an enlarged detail view of the lamp operating mechanism.

Referring in detail to the drawing 1 denotes a supporting bracket adapted to be secured to the side of an automobile in any suitable manner and including an upper horizontal arm 2 and a lower horizontal arm 3. The upper horizontal arm 2 is provided with an enlarged outer end formed with a large opening 4, and the lower horizontal arm 3 is provided with a similar enlarged outer end but formed with a pocket 5. The lower arm 3 is hollow, providing the chamber 6 which communicates with the pocket 5.

The inner portion of the top edge of the wall of the pocket 5 is formed with a recess 7 in which the lower end of the vertically disposed cylindrical casing 8 is seated. The casing 8 is mounted in the bracket 1 by inserting it through the large opening 4 in the upper arm 2, and when in position the top edge of the casing 8 is flush with the top face of the upper bracket arm 2. The casing 8 is fixedly locked in position by its engagement by the cover plate 9, which latter also serves as a closure for the opening 4, and is secured in position by the arm 10.

The casing 8 is provided with a pair of vertically disposed elongated lenses 11 which are mounted in respective openings provided therefor in the wall of the casing 8. The lenses 11 are diametrically disposed relatively to each other in the casing 8, and are respectively positioned in the front and rear of the casing 8 with respect to the position of the vehicle to which the device is attached. The lenses 11 may be of any desired colors, but preferably the rear lens is red, and the front lens is white.

An elongated hexagon shaped hollow signal cylinder 12 is shiftably mounted in the casing 8. The signal cylinder 12 is open at its top and has a reduced lower end which is fixed in a cup 13. The latter seats on the boss 14, formed centrally on the bottom of the pocket 5, and is pivotally connected to the boss 14 by means of the bolt 14'.

The signal designations are formed or stencilled in the flat sides of the hexagon signal cylinder 12, and are arranged so that each of one pair of flat sides 15, diametrically opposed with respect to each other, is formed with the vertically disposed signal designation "Stop". Each of another pair of opposed flat sides 16 is formed with the vertically disposed signal designation "Right" and each of the other pair of opposed flat sides 17 is formed with the vertically disposed signal designation "Left".

The cup 13 is formed with three laterally projecting apertured ears 18, 19 and 20. The ears 18 and 19 are diametrically opposed with respect to each other and each is disposed to align centrally with respective flat side 15 on which the signal designation "Stop" is formed. The ear 20 is disposed at right angles with respect to the ears 18 and 19 and extends inwardly toward the chamber 6 formed in the lower arm 3 of the supporting bracket 1.

A spiral spring 21 is mounted in the chamber 6 and has one end thereof attached to the apertured ear 20 and the other end to an apertured lug 22 formed on the inner wall of the chamber 6. The action of the spring 21 will normally hold the signal cylinder 12 in a position to keep the flat sides 15 thereof, respectively, disposed in front and rear with respect to the position of the vehicle to which the device is attached. In other words, the action of the spring 21 will normally keep the signal designations "Stop" in registration with the lenses 11 carried respectively on the front and rear of the casing 8.

The lamp 23 is fixed to and carried by the cover plate 9 and depends into the signal cylinder 12. The conductor 24 connects the lamp 23 with the ammeter of the motor vehicle, in the usual manner, and is provided with an operating switch 25 commonly secured to the underface of the vehicle body bottom. The switch 25 has a depending actuating lever 26 which is connected to the brake rod 27 by means of a pull rod 28 and bracket 29, as clearly shown in Figure 5, of the drawing. By operating the brake pedal 30, in the usual manner, the switch 25 will function to illuminate the lamp 23 and signal designations "Stop" as the latter are normally in registration with the lenses in the casing 8.

The operating mechanism for my improved device is preferably mounted on the instrument board of the motor vehicle and includes a dial plate 31 bearing the letters "R" "S" and "L", which represent "Right", "Stop", and "Left", respectively, and are indicated at 32, 33 and 34.

A shifting lever 35 is pivotally mounted on the dial plate 30 by means of a shaft 36, which is fixed to the lever 35 by its hub 35' and extends forwardly through the instrument board, in which it is suitably journaled. The forward end of the shaft 36 carries three arms 37, 38 and 39 fixed thereto. The latter arm 39 is disposed to depend parallel with respect to the shifting lever 35, and the arms 37 and 38 are disposed horizontally to extend at right angles with respect to the other arm 39 on respective sides of the shaft 36. An indicator 40 is fixed to the hub 35' to indicate to the operator the signal designation which is in registration with the lenses 11.

A flexible pull member 41 connects the switch lever 26 with the arm 39, and a pair of flexible pull members 42 and 43 connects the arms 37 and 38 with respective apertured ears 18 and 19.

A resilient arcuate locking member 44 is carried by the dial plate 30 and is formed with a pair of spaced catches 45 and 46, which are adapted to engage and secure the shifting lever 35 against the pull of the spring 21 mounted in the chamber 6 of the lower arm 3, in the manner to be described.

A pair of vertically disposed stops 47 are formed integrally with the bottom of the pocket 5 and are adapted to engage respective ears 18 and 19 to limit the movement of the signal cylinder 12 in either direction when the latter has been properly positioned to bring the signal designation "Right" on the flat sides 17, or to the signal designations "Left" on the flat sides 16 into registration with the lenses 11 of the casing 8.

In practice the operation of the signaling device is as follows:—Assuming that all parts of the device are in the position shown in the drawing, the depression of the service brake 30 will operate the switch 25 to illuminate the lamp 23 causing the display of the signal designations "Stop" which is normally in registration with the lenses 11 due to the action of spring 21. This operation is identical to the operation of the commonly used stop signals now on the market.

When it is desired to display the signal designation "Right", the operator will shift the lever 35 into the catch 46 and the indicator 40 will be directed to the dial letter 32. The shifting of the lever 35 will actuate the arm 37 to slacken the pull member 42, but the pull member 43, connected to the arm 38 and the apertured ear 19, will be actuated to rotate the signal cylinder 12 until the ear 18 abuts against its stop 47 thereby positioning the signal designation "Right" in registration with the lenses 11 of the casing 8.

During the shifting operation of the lever 35, as above described, the arm 39 connected with the switch lever 26 by the flexible member 41, will actuate the switch 25 to illuminate the lamp 23, simultaneously with the positioning of the signal casing 2 to the position desired. The signal designation "Right" will remain displayed until the lever 35 is manually released from the catch 46, allowing the spring 21 to again position the signal casing 12 in the normal position.

The operation of positioning the signal designation "Left" is identical to that above described with the exception that the lever 35 and associated parts are shifted in the opposite direction to cause the partial rotation of the signal casing 12 in the other direction.

From the foregoing description taken in connection with the accompanying drawing, the principle of construction and the method of operation will be readily apparent to those skilled in the art to which the invention appertains, and while describing what is now thought to be the best embodiment thereof, it is to be understood that the device shown in the drawing is merely illustrative, and that various changes in the form, proportions, and minor details of construction may be resorted to without departing from the principle or sacrificing any of the advantages of the invention, which come within the scope of the claim hereunto appended.

What I claim is:—

In combination, a signaling apparatus for motor vehicles comprising a bracket including a horizontally disposed upper arm and a horizontally disposed lower arm, said upper arm having an enlarged outer end formed with a large opening and said lower arm having an enlarged outer end, a cylindrical casing mounted on the said enlarged outer end of said lower arm and extending vertically into the said opening in the enlarged outer end of said upper arm, said casing provided with a pair of vertically extending lenses disposed diametrically relatively to each other on respective front and rear sides of said casing, a vertically disposed cylinder mounted in said casing and rotatably connected to the said enlarged outer end of said lower arm, said cylinder hexagonal-shaped in transverse cross section, corresponding signal designations formed on each pair of diametrically opposed side walls of said cylinder, a cover plate for said casing secured to the enlarged outer end of said upper bracket arm, an illuminating lamp carried by said cover plate and depending into said cylinder, a spring member carried in said lower bracket arm and connected with said cylinder for normally maintaining a pair of opposed designations in registration with said lenses, means for shifting said cylinder in said casing to selectively position the other of said designations in registration with said lenses, means for illuminating said lamp, and means for limiting the shiftable movement of said cylinder in said casing, substantially as described and for the purpose set forth.

In testimony whereof I affix my signature.

JAMES A. FOX.